United States Patent
Benjey et al.

[11] Patent Number: 6,085,771
[45] Date of Patent: Jul. 11, 2000

[54] TWO-STAGE FUEL TANK VAPOR RECOVERY VENT VALVE AND METHOD OF MAKING SAME

[75] Inventors: Robert P. Benjey, Dexter; Rudolph Bergsma, Ann Arbor, both of Mich.

[73] Assignee: Eaton Corporation, Cleveland, Ohio

[21] Appl. No.: 09/182,262

[22] Filed: Oct. 29, 1998

[51] Int. Cl.$^7$ .............................. F16K 24/04; F16K 31/20
[52] U.S. Cl. .................. 137/15.26; 137/43; 137/202; 137/430; 137/630.14; 141/44; 141/46; 141/59; 141/198; 141/302; 29/890.124; 29/890.126
[58] Field of Search ................................ 137/39, 43, 202, 137/430, 433, 630.14, 630.15, 15.26; 141/59, 198, 44, 46, 301, 302; 220/86.2, 86.3; 29/890.12, 890.124, 890.126

[56] References Cited

U.S. PATENT DOCUMENTS

| | | | |
|---|---|---|---|
| 4,982,757 | 1/1991 | Ohasi et al. | 137/202 |
| 5,044,389 | 9/1991 | Gimby | 137/39 |
| 5,172,714 | 12/1992 | Kobayashi et al. | 137/43 |
| 5,579,802 | 12/1996 | Tuckey | 137/43 |
| 5,582,198 | 12/1996 | Nagino et al. | 137/43 |
| 5,590,697 | 1/1997 | Benjey et al. | 141/59 |
| 5,640,989 | 6/1997 | Nemoto et al. | 137/39 |
| 5,678,590 | 10/1997 | Kasugai et al. | 137/43 |
| 5,694,968 | 12/1997 | Devall et al. | 137/43 |
| 5,755,252 | 5/1998 | Bergsma et al. | 137/43 |
| 5,944,044 | 8/1999 | King et al. | 137/43 |
| 5,954,082 | 9/1999 | Waldorf et al. | 137/43 |
| 5,960,816 | 10/1999 | Mills et al. | 137/202 |

*Primary Examiner*—George L. Walton
*Attorney, Agent, or Firm*—Roger A. Johnston

[57] ABSTRACT

A two-stage venting on-board refueling vapor recovery (ORVR) valve for controlling fuel tank venting to a storage canister during tank filling. A float actuated poppet has a small second stage venting hole therethrough. The poppet is mounted for relative movement with respect to a second stage vent valve member disposed on the float. During tank filling, venting is through a first stage relatively large flow area passage until rising fuel level causes the poppet to close the first stage vent flow area. Venting during continued filling is through the second stage venting hole in the poppet. After first stage valve closure relative movement or lost motion occurs between the first and second stage valve members. The poppet has an integrally molded annular resiliently flexible seal thereon which has a first stage annular sealing surface formed on one side of the poppet for sealing the first stage flow area, and a second stage annular sealing surface about the poppet hole on the opposite side of the poppet for sealing the second stage vent flow area and closing the vent passage.

4 Claims, 3 Drawing Sheets

TWO-STAGE FUEL TANK VAPOR RECOVERY VENT VALVE AND METHOD OF MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to valves employed for controlling the venting of fuel vapors from a motor vehicle fuel tank during refueling or tank filling and are sometimes known as onboard refueling vapor recovery valves (or ORVR valves). Such valves control the venting of fuel vapor during tank filling, typically through a separate filler neck in the fuel tank, where the valve is connected to control flow of vapor from the tank vent to a recovery trap such as a charcoal filled storage canister which can be purged by connection to the engine intake manifold during engine operation.

Such fuel vapor recovery systems are widely employed in passenger and light truck motor vehicles which use highly volatile hydrocarbon fuel such as gasoline to prevent escape of fuel vapor to the atmosphere during refueling and periods of engine shut down.

Heretofore, known ORVRs have employed a float operated poppet or valve which closes a first stage or larger diameter vent passage during filling when the fuel in the tank reaches a level where the portion of the liquid fuel is greater than the portion of vapor. A second float operated valve is employed to close a secondary smaller vent passage which permits venting therethrough while the fuel level continues thereafter to rise and is closed when the fuel level reaches the top of the tank. Examples of this type of ORVR are shown and described in U.S. Pat. No. 5,590,697 which discloses a two-stage ORVR wherein the second smaller passage is formed through the poppet and the second valve is operated by the same float as the poppet.

Referring to FIGS. 3 and 4, a valve assembly of the prior art is shown as having a valve body 1, having a lower portion 2 received through an aperture 3 in the top wall 4 of a fuel tank and the body has a fuel vapor recovery vent port 5 which is adapted for connection to a fuel vapor storage canister 6 which is typically connected to the engine inlet manifold 7.

The body is typically sealed in the top wall of the tank by a resilient seal ring 8; and, the lower portion 2 has a passage 9 communicating downwardly from the port 5 to a valve seating shoulder 10 formed therein which forms the upper end of a hollow chamber 11 which has a float 12 disposed therein. The float is typically biased in the direction of buoyancy by a calibration spring 13.

The float 12 has thereon a poppet subassembly indicated generally at 14 which has a second stage reduced diameter vent passage 15 formed therethrough and has a flexible elastomeric seal 16 received thereover on the upper surface of the inverted cup-shaped member 17 for sealing against the sealing surface 10 thereby closing first stage vent passage 9. Member 17 is retained on float 12, in telescoping lost motion arrangement by a cage member 12a secured to the float 72. A secondary valve member 18 is disposed on the upper surface of the float 12 and is moved upwardly by continued movement of the float after seal 16 has closed the passage 9 by virtue of the telescoping of the cup-shaped member 17 within cage 12a.

The cup 17 has a second annular flexible elastomeric seal lip 19 provided on the inner surface of the upper closed end thereof for sealing on the surface of valve 18.

In operation, the tank 4 is filled with fuel through a filler neck (not shown) and the fuel vapor is displaced outwardly through port 5 to the canister 6 by the rising level of liquid fuel in the tank. Upon the liquid fuel reaching a predetermined level, typically more than the majority of the capacity of the tank, float 12 causes the poppet 14 to move upwardly closing seal 16 on seat 10 to close off the large flow area to passage 9. As liquid fuel is continued thereafter to be added to the tank, vapor is vented through cross ports 20 in the member 14 and through the reduced diameter vent passage 15 until the capacity of the tank is reached wherein the float 12 causes valve member 18 to seat against the seal lip 19 and close off vent passage 15. Thus, a two-stage venting of the fuel vapor to the canister during filling is effected.

The poppet assembly has the upper resilient seal 16 secured on the cup 17 by a separate cap member 21 received over the upper end of the cup 17 and snap locked thereon, thus forming a four piece assembly of the flexible seals 16, 19, the cup 17 and the cap 21.

In such arrangements, the valve closing forces available are quite minimal due to the low density or specific gravity of the fuel and the small displacement of the float. Therefore, in the aforesaid known valve constructions resiliently flexible seals have been required to seal the first stage poppet about the larger vent passage and the second valve member about the smaller vent passage. This requirement has resulted in added complexity to the valve design by virtue of requiring separate resiliently flexible seals; and, additional parts are required in assembly to retain such seals in the valve during manufacturing. This has resulted in additional parts and a relatively high manufacturing cost and assembly problems during manufacturing. Therefore, it has long been desired to provide a way or means of making a two-stage ORVR which can seal the vent ports reliably with float buoyancy forces and which is robust and relatively low in manufacturing cost for high volume automotive applications.

BRIEF SUMMARY OF THE INVENTION

The present invention provides a two-stage float operated ORVR which utilizes a first stage float operated poppet to close a primary or first stage relatively large vent flow area when the fuel level in the tank reaches a predetermined level where the greater portion of the tank is filled with liquid fuel. Upon continued filling fuel vapor vents through a reduced flow area second stage vent passage formed through the first stage valve poppet member. A second stage valve member is also operated by the float to close the smaller second stage vent passage when the fuel level reaches the top of the fuel tank at the full position. The smaller vent area second stage passage thus operates between closure of the first stage large vent area passage during refueling until the tank is full. A cage retains the first stage valve poppet on the float and is operative to permit relative movement between the second stage valve member and the first stage poppet after the first stage valve has closed.

The poppet has an annular resiliently flexible seal formed integrally as a one-piece member having an annular seal surface disposed on one side of the poppet for sealing the larger first stage vent passage and a smaller diameter annular seal surface formed thereon and disposed on the opposite side of the poppet for second stage sealing about the smaller vent passage through the center of the poppet. Preferably the annular seal member is molded as a one-piece member with the material thereof extending through and filling an array of holes through the poppet disposed about the center vent passage. The annular seal member may be molded by compression molding, transfer molding or injection molding of elastomeric material such as fluorosilicone material. The valve assembly of the present invention thus provides for resiliently flexible elastomeric sealing of the large and smaller first stage and second stage vent passages of an ORVR by a common member having oppositely disposed annular sealing surfaces and provides a design with a minimum number of parts, which is easy to manufacture, reliable and relatively low in manufacturing cost.

DETAILED DESCRIPTION OF THE INVENTION

Figure 1:
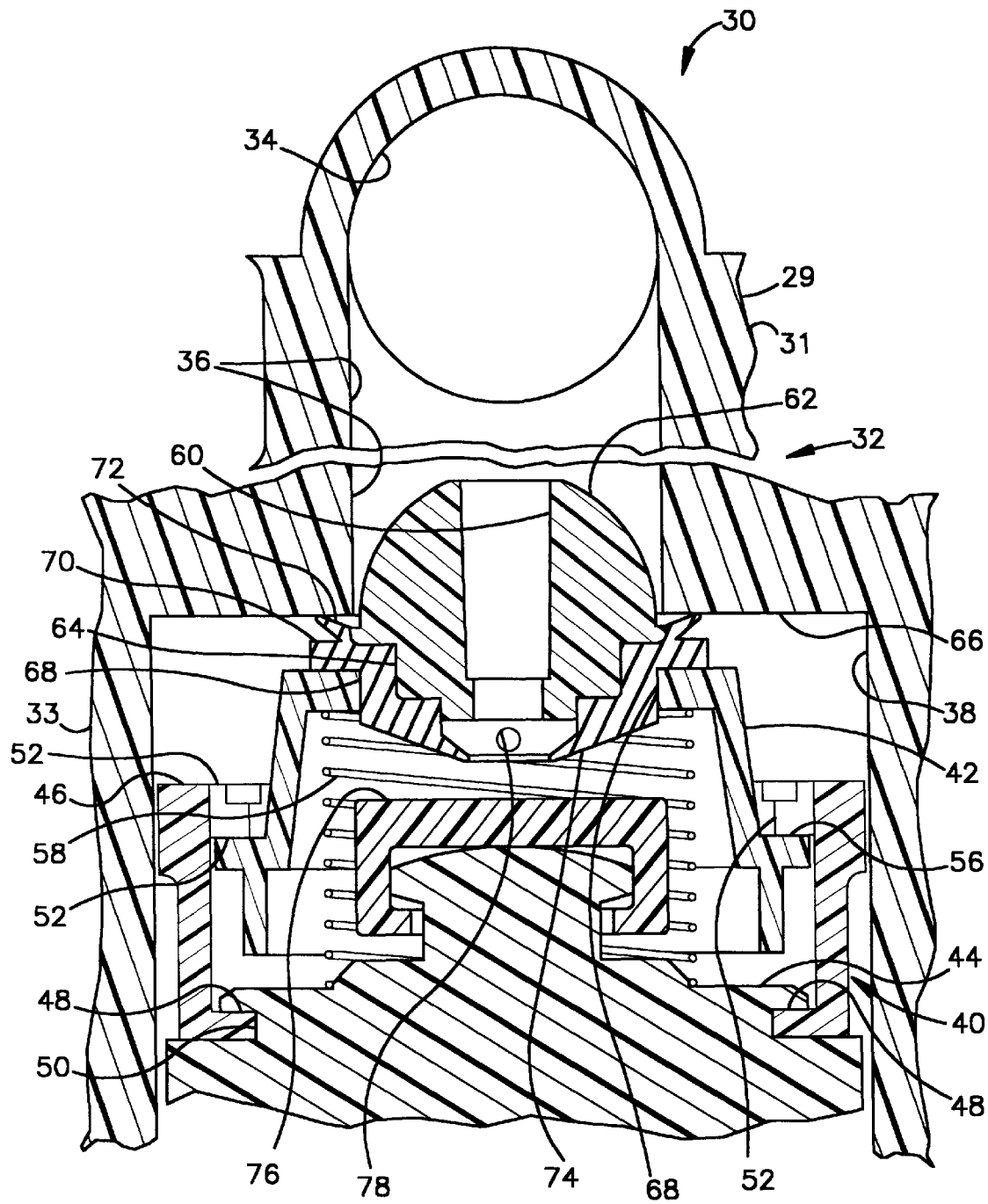
FIG. 1 is an abbreviated cross-section of the valve assembly of the present invention.
Figure 2:
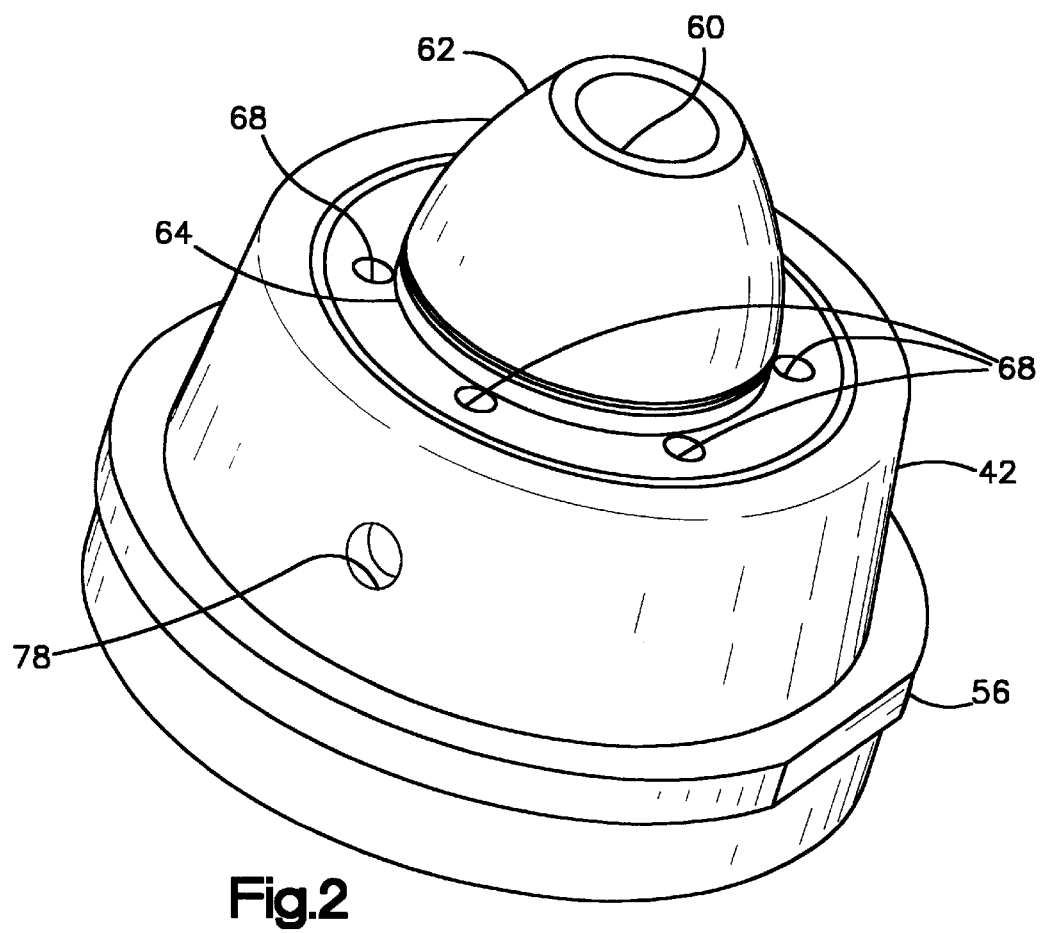
FIG. 2 is an enlarged axonometric view of the poppet of the valve of FIG. 1.
Figure 3:
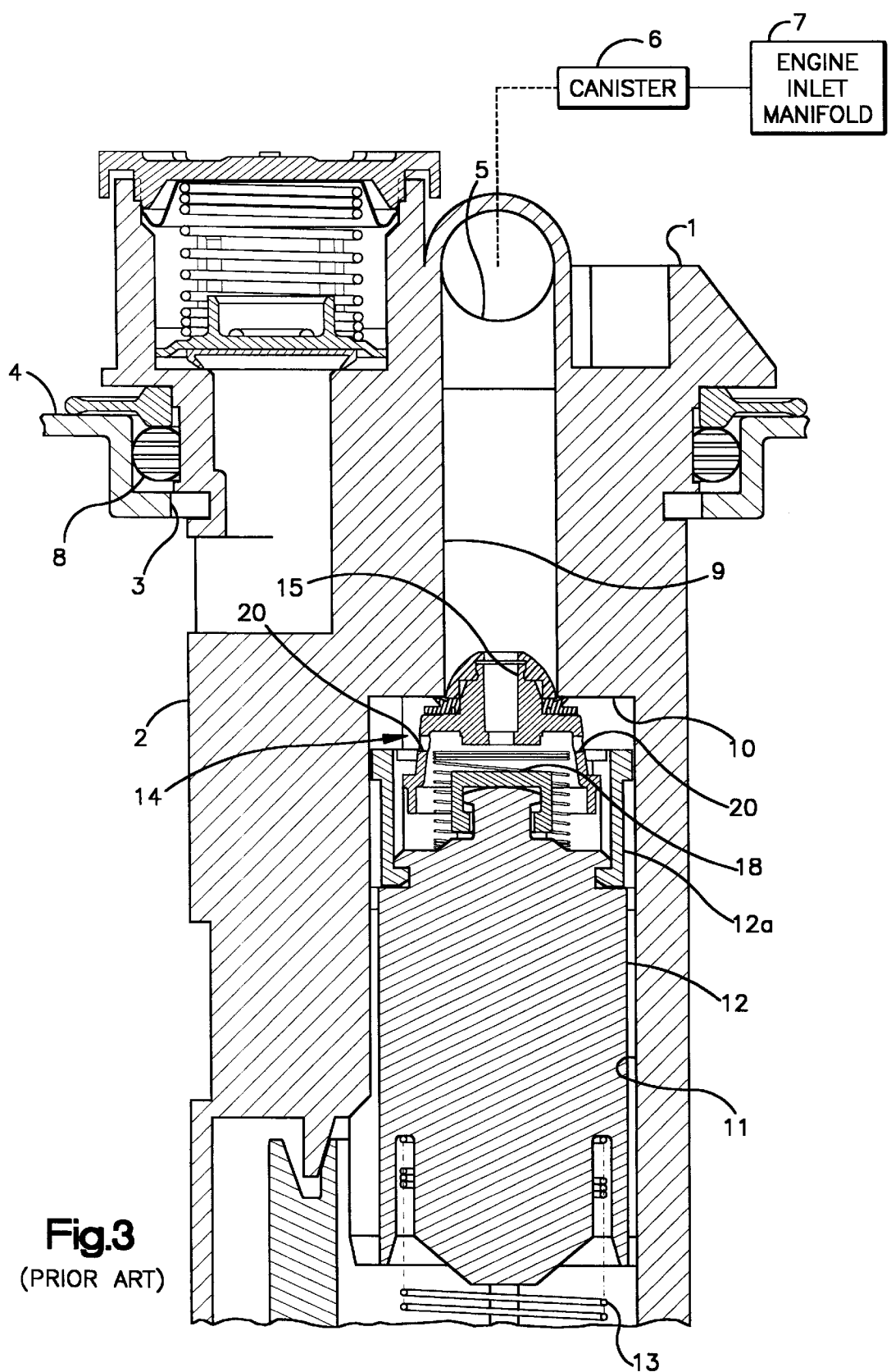
FIG. 3 is a cross-section of a complete two-stage fuel vapor vent valve of the prior art; and, FIG. 4 is an enlarged view of the poppet assembly of the prior art valve of FIG. 3.

Referring to FIGS. 1 and 2, the valve assembly of the present invention is indicated generally at 30 and includes a valve body indicated at 32 with the portions thereof passing through the fuel tank wall omitted to facilitate enlarged illustration and body 32 has a vapor vent outlet port 34 formed therein in a manner similar to the port 5 of the prior art of FIG. 3.

The valve body 32 includes an upper portion 31 which extends outwardly of the top surface of the fuel tank with the vent port 34 formed therein and which is intended for connection to canister 6. A lower portion 33 of body 32 extends downwardly through an unshown aperture in the fuel tank upper wall in the same manner as does the portion 2 in the FIG. 3 prior art embodiment.

The body 32 has a passage 36 extending downwardly therein which communicates the vent port 34 with a float hollow 38 formed in the lower body 33 into which is received for guided movement therein a float assembly indicated generally at 40. The float assembly 40 includes a poppet comprising an inverted generally cup-shaped member 42 which is retained on a float 44 by a cage member 46 which is attached to the upper end of poppet 44 by snap-locking projections 48 which engage groove 50 provided in the float. The cup-shaped member 42 is retained in the cage by inwardly extending projections 52. The projections 52 may alternately comprise a continuous annular flange. Member 42 is telescopically or relatively moveable with respect to cage 46 in a downward direction when a sufficient force is applied thereto to overcome the bias of a spring 58 which urges the outer annular flange 56 of the cup in registration against the undersurface of the projections 52.

The inverted cup-shaped member 42 has a preferably centrally disposed vent passage 60 extending downwardly therethrough, which passage has a diameter substantially less than the diameter of the vent port 34 in passage 36. The inverted cup-shaped member 42 also has a pilot portion 62 extending upwardly from the upper end thereof and into passage 36. The base of the guide portion 62 has an annular groove 64 formed therein.

The hollow interior 38 of the lower body portion 33 has a closed end 66 which intersects the vent passage 36 to form an annular valve seat for the first stage valve as will hereinafter be described.

Figure 4:
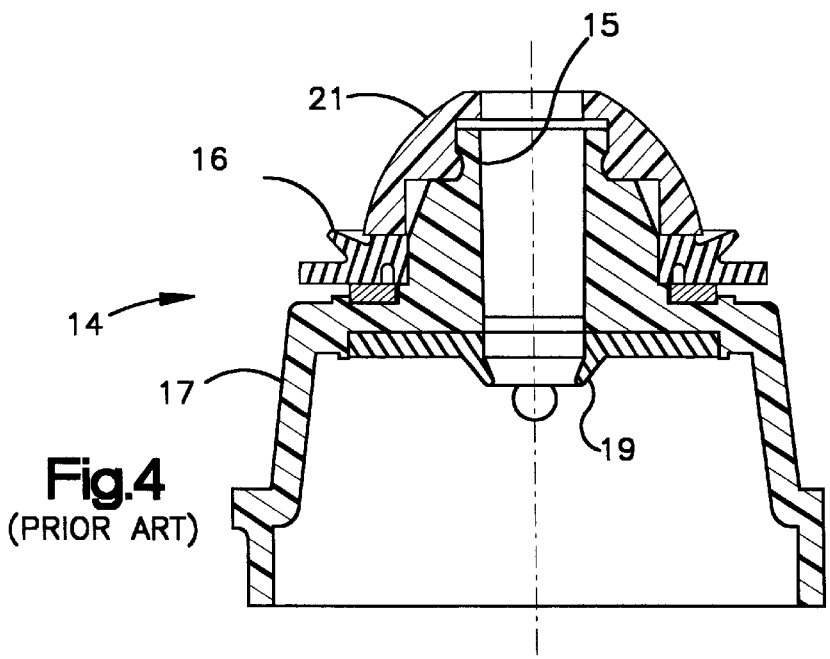

The cup-shaped member 42 has a plurality of apertures 68 formed in the closed end thereof and disposed in spaced arrangement about the pilot portion 62. An annular sealing member 70 is integrally formed as a one-piece member with the material thereof extending through and filling the apertures 68. Seal member 70 forms about the base of the guide portion 62 an annular resiliently flexible sealing lip 72 which, upon upward movement of the float 44, contacts annular surface 66 and seals thereabout and effects first stage valve closing. A second reduced diameter annular resiliently flexible sealing lip 74 is formed on the sealing member 70 and disposed on the undersurface of the inverted cup 42. In the present practice of the invention, the seal member 70, including the upper and lower annular sealing lips 72, 74 may be molded on cup 42 by any of the techniques of compression molding, transfer molding or injection molding. In the presently preferred practice of the invention, the seal member 70 is formed of fluorosilicone elastomer and preferably has a durometer of about 50–60 on the Shore "A" scale. However, other materials and other diameters may be used for member 70. The subassembly of the annular seal 70 and the cup 42 thus function to replace the four-piece subassembly 14 of the prior art embodiment as shown in FIG. 4.

A second stage valve member 76 is disposed on the upper end of float 44; and, the valve member 76 closes against the annular seal lip 74 upon movement of the float further in an upward direction upon additional liquid fill of the tank after closure of first stage valve. The buoyancy of the float 44 thus compresses spring 58 and the overtravel movement of valve member 76 with respect to member 42 is absorbed by compression of spring 58 and telescoping relative movement of the flange 56 of cup 42 in the cage 46. Thus, upon the liquid level in the tank reaching a first predetermined level during filling first stage valve seal 72 closes the larger flow area comprising the lower end opening of passage 36 and upon continued filling, second stage vapor venting thereafter is accomplished through the second stage reduced diameter passage 60 until such time as the float closes valve member 76 against lip seal 74 thus closing second stage passage 60. A plurality of cross ports 78 supply passage 60 during second stage venting.

The present invention thus provided a float valve assembly for a two-stage ORVR in which the valve poppet includes an integrally molded annular elastomeric seal member having a first stage annular sealing surface on one side thereof and a integrally formed resiliently flexible secondary annular sealing surface of reduced diameter on the opposite side thereof for second stage valve closing by movement of the float. The valve assembly of the present invention thus has the advantage of being lower in manufacturing cost by virtue of fewer parts and is simpler to assemble in high volume mass production.

Although the invention has hereinabove been described with respect to the illustrated embodiments, it will be understood that the invention is capable of modification and variation and is limited only by the following claims.

What is claimed is:

1. A method of making a two stage float operated fuel tank vapor vent valve assembly comprising:

(a) providing a valve body with a vent passage and a float operated poppet and forming a flow passage of lesser flow area than said vent passage through said poppet;

(b) moving said poppet and closing said vent passage when the fuel level reaches a first predetermined level during filling of the tank;

(c) disposing a moveable valve member for movement by said float and closing said flow passage when the fuel level in said tank reaches a second predetermined level higher than said first predetermined level during filling of the tank; and, (d) molding a first annular resiliently flexible seal in place on one side of said poppet for sealing about the vent passage and on the side of said poppet opposite said one side molding in place a second annular seal for sealing about said flow passage and flowing the material of said first and second seals through said poppet during said molding and together forming said first and second seals in place as an integral member.

2. The method defined in claim 1, wherein said step of forming integrally includes molding selected from the group consisting of compression molding, transfer molding and injection molding.

3. The method defined in claim 1, wherein said step of forming integrally includes forming a plurality of apertures through said poppet in an array about said flow passage and filling said apertures with seal material.

4. The method defined in claim 1, wherein said step of forming integrally includes molding said first and second annular seals of fluorosilicone elastomer.

* * * * *